219-121 SR

10/22/85 OR 4,549,067

United States Patent [19]

Beisswenger et al.

[11] Patent Number: 4,549,067

[45] Date of Patent: Oct. 22, 1985

[54] METHOD FOR CHECKING PRINTING FORM SURFACES ENGRAVED BY MEANS OF AN ELECTRON BEAM

[75] Inventors: Siegfried Beisswenger; Wolfgang Boppel, both of Preetz, Fed. Rep. of Germany

[73] Assignee: Dr. Ing. Rudolf Hell GmbH, Fed. Rep. of Germany

[21] Appl. No.: 548,518

[22] Filed: Nov. 3, 1983

[30] Foreign Application Priority Data

Nov. 4, 1982 [DE] Fed. Rep. of Germany ....... 3240653

[51] Int. Cl.[4] .............................................. B23K 15/00

[52] U.S. Cl. ........................ 219/121 EK; 219/121 EJ; 219/121 EV; 219/121 EY; 219/121 EP

[58] Field of Search ................... 219/121 EJ, 121 EU, 219/121 EV, 121 EX, 121 EY, 121 EP, 121 EB, 121 EM, 121 EW; 250/310, 492.2, 491.1

[56] References Cited

U.S. PATENT DOCUMENTS

| | | | |
|---|---|---|---|
| 3,246,079 | 4/1966 | Teucher | 219/121 EW X |
| 3,404,254 | 10/1968 | Jones | 219/121 EV X |
| 4,041,311 | 8/1977 | Martin | 250/310 X |
| 4,460,827 | 7/1984 | Onoguchi et al. | 250/310 |

FOREIGN PATENT DOCUMENTS

| | | |
|---|---|---|
| 55965 | 4/1891 | Fed. Rep. of Germany . |
| 1099659 | 2/1961 | Fed. Rep. of Germany . |
| 1299498 | 7/1969 | Fed. Rep. of Germany . |

OTHER PUBLICATIONS

"Raster-Elektronenmikroskopie" by L. Reimer and G. Pfefferkorn, Springer-Verlag, Berlin, Heidelberg, New York, 1977.

*Primary Examiner*—C. L. Albritton

*Attorney, Agent, or Firm*—Hill, Van Santen, Steadman & Simpson

[57] ABSTRACT

An electron beam generator designed for engraving surfaces of printing form cylinders is switched to microscope operation during engraving pauses in order to make engraved cups visible immediately and without additional auxiliary equipment. During microscope operation, deflection parameters and an intensity of an electron beam produced by the electron beam generator are changed for appropriate scanning. An image signal is acquired by detecting secondary electrons generated by the beam interacting with the cups in the printing form surface.

4 Claims, 2 Drawing Figures

METHOD FOR CHECKING PRINTING FORM SURFACES ENGRAVED BY MEANS OF AN ELECTRON BEAM

BACKGROUND OF THE INVENTION

The present invention relates to a method for checking printing form surfaces engraved by means of an electron beam which creates cup-like depressions in the printing form surfaces.

Methods for producing printing forms by means of an electron beam are already known wherein the material of the surface of the printing form is removed by means of the electron beam, for example German Pat. No. 55 965, incorporated herein by reference, in which the principle of electron beam engraving is described. It is desirable, however, to check the result of the engraving, i.e. to check the cups engraved in the printing form surface and to make them visible. A stereo microscope is built into the electronic beam generator for this purpose given devices for material processing, for example German Pat. No. 10 99 659, incorporated herein by reference.

A separate monitoring beam path that is directed at a radiation receiver 19 is provided in German Pat. No. 12 99 498, incorporated herein by reference. A photo-electric transducer is provided as the radiation receiver, this being followed by a display means from which a direct conclusion concerning the focus status of the electron beam may be drawn. This signal can then be employed for the intensity control of the processing beam.

These devices are unsuitable for a direct, optical check of the engraved cup.

SUMMARY OF THE INVENTION

It is an object of the invention to specify a method for producing printing forms wherein a simpler and more reliable check of the cups produced is possible.

According to the invention, the electron beam generator employed for engraving the cup-like depressions in the surface of the printing form is alternatively employed as a scanning electron microscope for checking a shape of the cups by scanning a region of the printing form to be imaged. The electron beam is switched to a microscope mode during this time period with respect to its deflection parameters and its intensity. A video signal is acquired for drive of a monitor from secondary electrons generated by the beam interacting with the cups in the printing form surface.

In order to switch the electron beam generator for material processing to the electron beam microscope mode, the beam is reduced to approximately 1 μm diameter in comparison to the engraving mode. The beam also experiences an x and a y deflection in order to scan the cup area to be represented. The secondary electrons thereby generated are detected and are employed as a video signal for the drive of a monitor.

A great advantage of the present invention lies in the fact that a special optical check means or a separate electron beam microscope need not be provided. Rather, an electron beam microscope mode is enabled during the engraving pauses in a simple manner on the basis of the present invention with an electron beam gun that is designed for the material processing. Electron beam microscopes are indeed known per se, but electron beam microscopes cannot be employed or modified for material processing. With respect to the known electron beam microscopes, attention is drawn to the book by L. Reimer and G. Pfefferkorn, *Raster-Elektronenmikroskopie,* Springer Verlag Berlin, Heidelberg, New York 1977, Chapter 1 Introduction, pages 1, 2 and 3, incorporated herein by reference, in which the circuit structure for the detection of the secondary electrons as well as for the connection of the monitor are specified in FIG. 1.1 and the corresponding description. A copy of this reference is attached to this specification.

The present invention proceeds from an electron beam generating system that has been specifically designed for material processing and for the production of printing forms.

DESCRIPTION OF THE PREFERRED EMBODIMENTS

Figure 1:
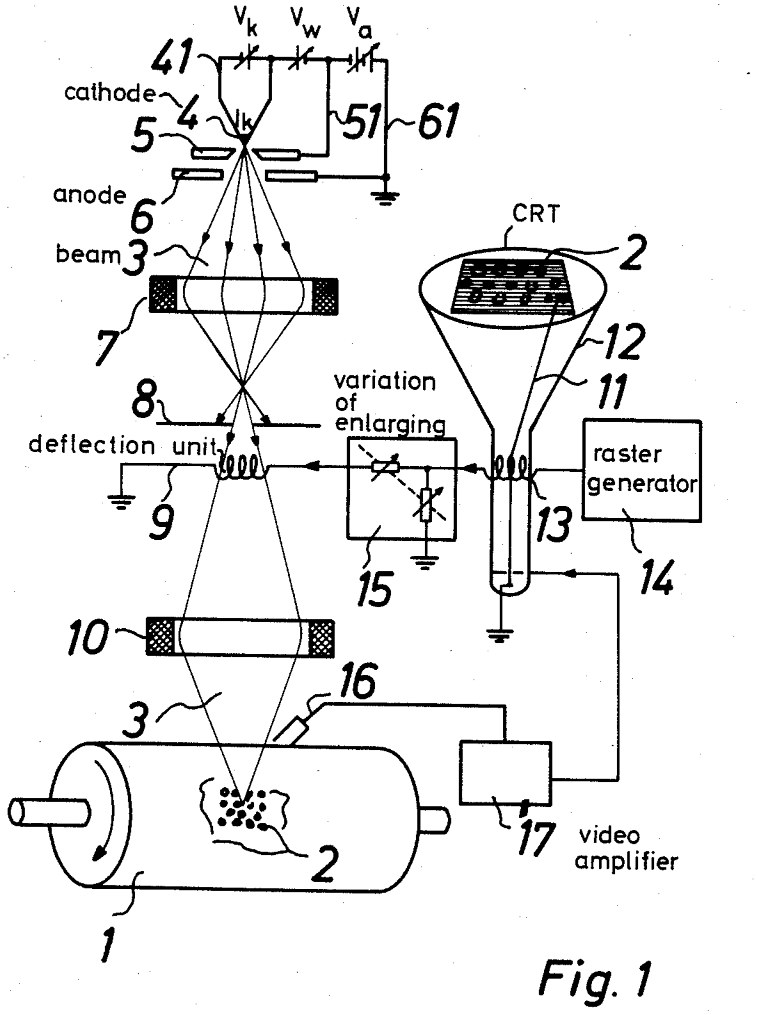
FIG. 1 shows the structure of an apparatus for the implementation of the method according to the invention.

FIG. 1 shows a printing cylinder 1 with engraved cups 2 which have been produced by an electron beam 3. Such printing cylinders are employed as printing forms in rotogravure, whereby the cups, here having different volumes based on the tonal value to be printed, are filled with printing ink in the printing process and the ink is transferred to the printed matter during printing.

The electron optics system and the beam path of an electron beam generator by means of which the invention can be implemented are shown in detail in FIG. 1. The electron beam 3 proceeds from a heated cathode 4 which lies in a heater circuit 41 that exhibits a voltage source $V_k$ (for example, 6 volts). The beam passes through the Wehnelt cylinder 5 and the anode 6 and arrives at a first lens system 7 that is shown in greater detail in FIG. 2. The Wehnelt cylinder 5 is connected in a circuit 51 with the voltage source $V_w$ (for example, 100 volts). The anode 6 is connected in a circuit 61 with a voltage source $V_a$ for the anode voltage (5 through −50 KV).

An aperture diaphragm 8 is also provided and the beam transmitted through the diaphragm traverses a deflection unit 9 and a second lens system 10 before it impinges on the engraving cylinder 1. The deflection unit 9 serves to move the deflection or scanning beam in line-like fashion across the cups 2 to be scanned. This scanning motion is simultaneously executed by the electron beam 11 of a picture tube 12 by means of a second deflection unit 13. The generation of the corresponding deflection currents ensues in a raster generator 14, and the two deflection units 9 and 13 are connected to one another over a unit 15 for variation of the magnification. A probe 16 is situated to the side of the engraved cups in a vacuum. This probe 16 collects secondary electrons proceeding from the surfaces of the printing form and reflected electrons and forwards them to a video amplifier 17, proceeding from which the intensity modulation of the picture tube 12 ensues. The scanning raster is represented on the picture screen of the picture tube 12.

Figure 2:
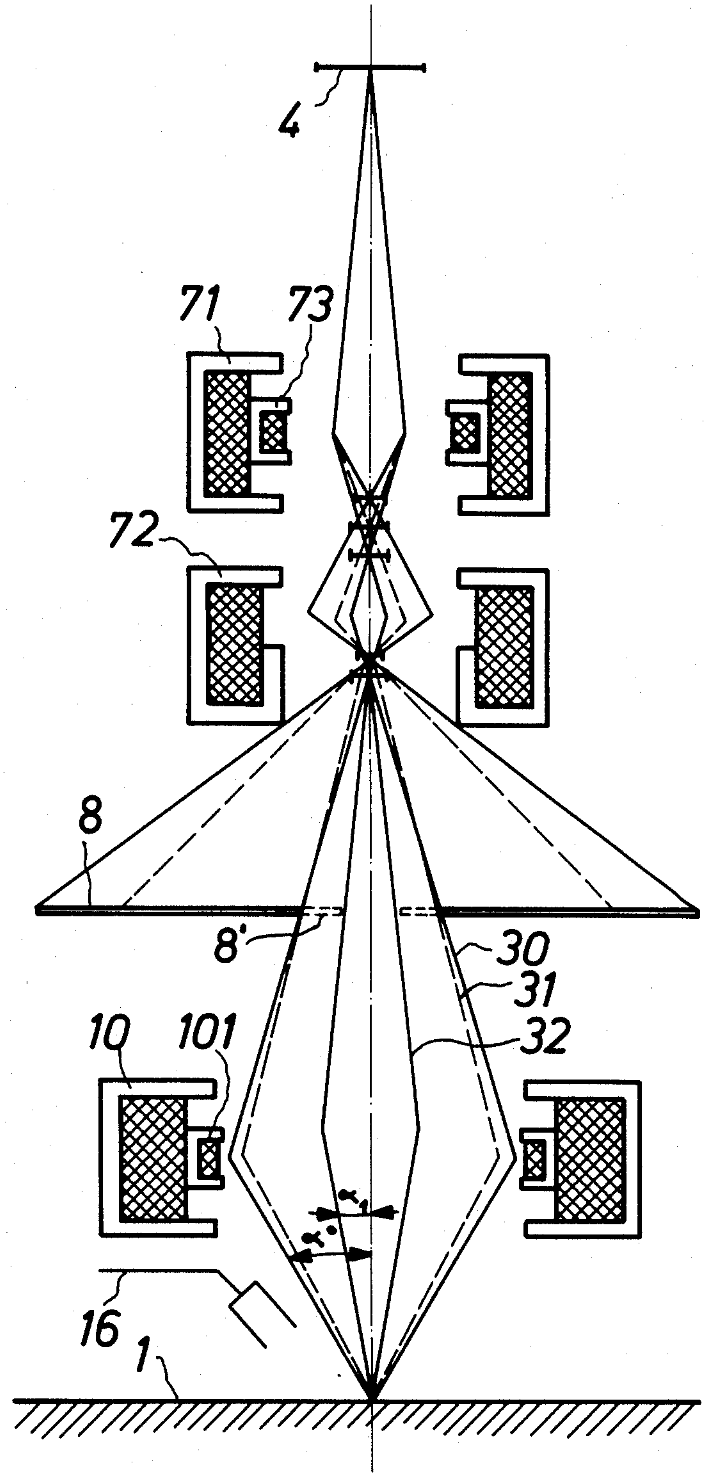
FIG. 2 shows the structure of the electron beam generating system for an engraving mode and for a microscope mode.

The electron beam generating system and the beam path for the various operating modes—engraving and microscope mode—are shown in a more detailed fashion in FIG. 2, whereby the actual electron beam generating system comprised of cathode, Wehnelt and anode as well as the deflection coils has been omitted for the sake of clarity. The first lens system 7 which produces a first demagnification comprises two lenses 71 and 72 in practice and a further lens 73 is provided inside the lens 71 for the engraving mode. Three operating examples shall be explained below on the basis of the indicated beam paths 30, 31 and 32, specifically the engraving of a large cup (beam path 30), the engraving of a small cup (beam path 31), and the illustration of a microscope mode (beam path 32).

1. Engraving mode

The lens system 71, 72, and 73 forms a variable demagnification stage, whereby the schematically illustrated radiation source is reduced 12x given the maximum magnification of the lens and is reduced 3x given a normal lens. The aperture diaphragm 8 is dimensioned such that an angle $\alpha_0$ of 0.08 rd is given, whereby a spherical aberration disc of 25 $\mu$m diameter results. The lens 10 produces a 4x demagnification and the lens 101 serves for focussing and defocussing the beam, whereby cups are produced. A processing effect occurs given a focussed beam and does not occur given a defocussed beam. As already mentioned, the beam path 30 is set for engraving large cups, whereby the beam has a diameter of approximately 100 $\mu$m at the point of incidence and exhibits a beam current of 50 mA in the processing spot.

The beam path 31 serves for producing small cups. At its point of incidence, the beam has a diameter of approximately 20 $\mu$m and the current in the spot amounts to 3 mA. The variation in cup size dependent on tonal value is undertaken by means of a varying magnification of the dynamic lens 73.

An acceleration voltage of 50 KV is employed in the engraving mode and in the microscope mode, and the beam emerging from the cathode has a current of approximately 50 mA.

2. Microscope mode

The dynamic lens 73 is switched off. The static lens 71 is more strongly excited and the demagnification of the radiation source amounts to approximately 250 W.

A smaller aperture diaphragm 8' (shown with broken lines in the Figure) is employed, being pivoted into the beam path for this purpose. The aperture of this diaphragm amounts to $\alpha_1 = 0.025$ rd. This yields a spherical aberration disc of approximately 1 $\mu$m.

The lens 10 remains nearly unaltered and the dynamic focussing lens 101 is switched off.

The beam path 32 is produced as a result of this modification, whereby the lens 10 serves only for focussing. The probe diameter on the surface of the cylinder amounts to 1 through 1.5 $\mu$m.

The deflection system 9 shown in FIG. 1 serves to generate the scanning raster corresponding to the line and picture frequency of the picture tube 12. The scanned field amounts to approximately 1 mm$^2$. As described in FIG. 1, a secondary electron detector 16 is provided for the microscope mode, this likewise being pivoted in like the diaphragm 8' during the microscope mode. The imaging of the cup on the picture tube appears as though the cup had been illuminated from the side since the detector 16 is directed toward the cups in the surface of the printing form from one side, and the electrons that are reflected at the inside of the cup lying opposite the detector produce a better yield at the detector 16.

Printing form cylinders that are standing still can be used in the execution of the method, whereby the entire x and y deflection for the scanning event is generated by the deflection systems of the electron beam generating system. It also lies within the framework of the invention that the scanning of the cups to be examined occurs given a rotating printing cylinder. The electron beam is likewise fine-focussed and the individual picture lines result due to the rotation of the printing form cylinder. The forward feed is intermediately stored and likewise used for the drive of the monitor. Such intermediate memories are known in the form of image repetition memories or so-called refresh memories.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for engraving and then checking cups in a printing form surface, comprising the steps of:

engraving the cups by means of an electron beam of an electron beam generator wherein the electron beam forms cup-like depressions in a surface of the printing form;

operating the same electron beam generator as a scanning electron microscope for checking a shape of the cups by scanning a region thereof to be imaged, the electron beam being switched to a microscope mode with respect to its deflection parameters and its intensity; and acquiring a video signal for drive of a monitor from secondary electrons generated by the beam intersecting with the cups in the printing form surface.

2. A method according to claim 1 wherein when the electron beam generator is changed over from an engraving mode to the microscope mode, the electron beam is narrowed by an appropriate magnification change in an electronic lens system of the current beam generator.

3. A method for checking cups in a printing form surface engraved by means of an electron beam of an electron beam generator wherein the electron beam engraves cups by forming cup-like depressions in a surface of the printing form, comprising the steps of:

operating the electron beam generator as a scanning electron microscope for checking a shape of the cups scanning a region thereof to be imaged, the electron beam being switched to a microscope mode with respect to its deflection parameters and its intensity;

acquiring a video signal for drive of a monitor from secondary electrons generated by the beam intersecting with the cups in the printing form surface;

when the electron beam generator is changed over from an engraving mode to the microscope mode, narrowing the electron beam by an appropriate magnification change in an electronic lens system of the current beam generator; and replacing a diaphragm aperture employed during the engraving mode by a smaller diaphragm aperture during the microscope mode.

4. A method for engraving and then checking cups in a printing form surface, comprising the steps of:

engraving the cups by means of an electron beam of an electron beam generator wherein during an engraving mode the electron beam forms cup-like depressions in a surface of the printing form;

changing the same electron beam generator from the engraving mode to a microscope mode when imaging of the cups is desired;

when changing from the engraving mode to the microscope mode changing a beam width of the electron beam as it approaches the surface being scanned so that the beam width is narrower; and detecting secondary electrons generated by the beam interacting with the cups in the printing form surface and using a signal derived from the secondary electrons to provide an image of the cups being scanned.

* * * * *